May 18, 1965 G. R. JACKSON 3,184,189
DUAL PURPOSE RETRACTABLE UNDERCARRIAGE
Filed March 15, 1963 5 Sheets-Sheet 1

Inventors
GEORGE RONALD JACKSON
by: Cavanagh & Norman

May 18, 1965   G. R. JACKSON   3,184,189
DUAL PURPOSE RETRACTABLE UNDERCARRIAGE
Filed March 15, 1963   5 Sheets-Sheet 2

Inventor
GEORGE RONALD JACKSON
by: *Cavanagh & Norman*

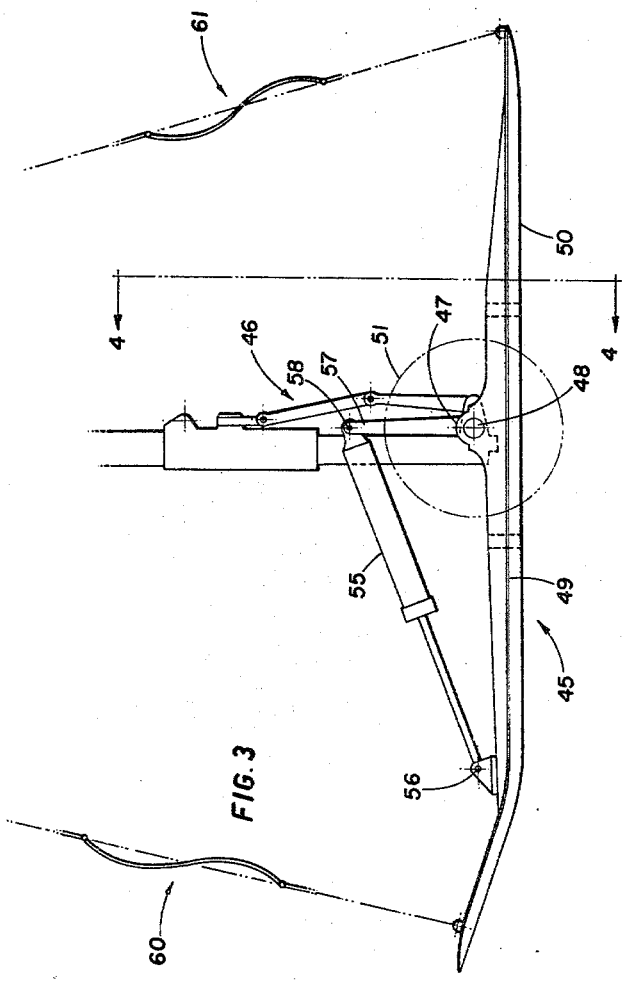

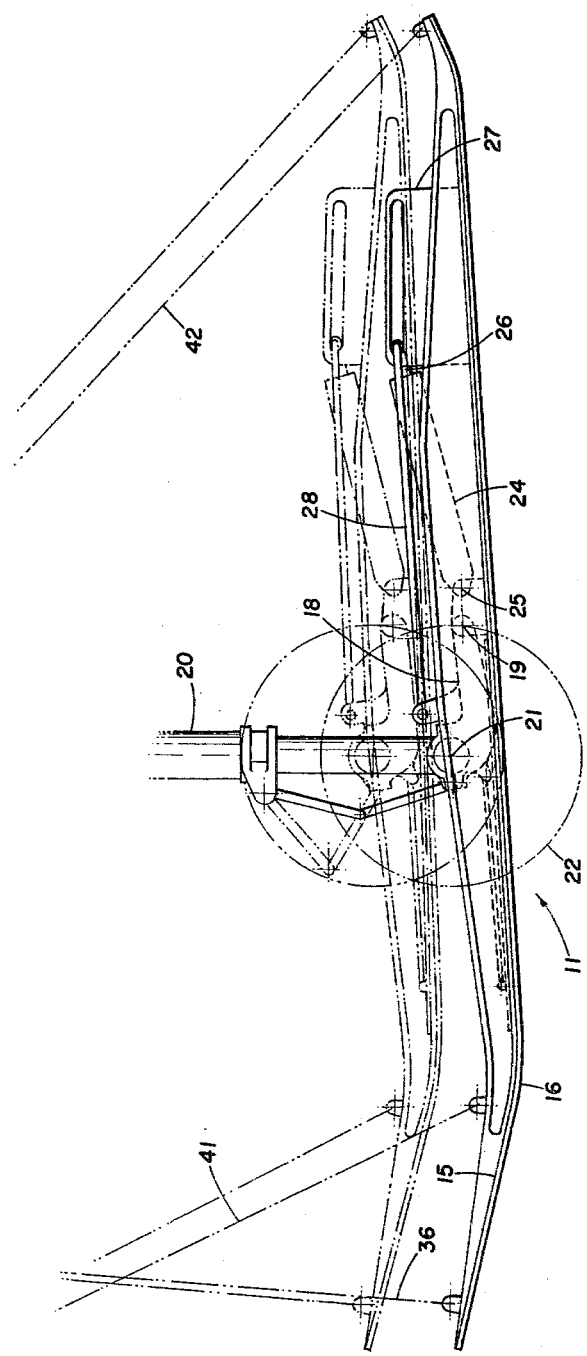

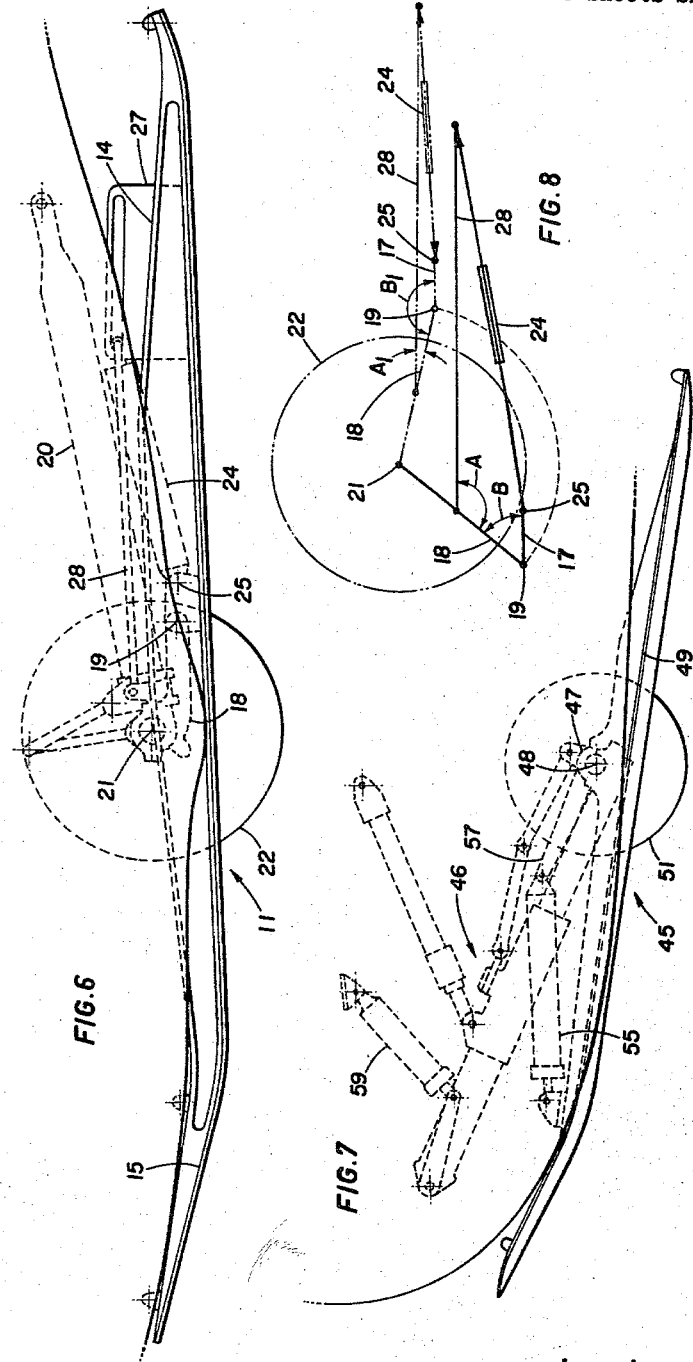

United States Patent Office

3,184,189
Patented May 18, 1965

3,184,189
DUAL PURPOSE RETRACTABLE UNDERCARRIAGE
George Ronald Jackson, Toronto, Ontario, Canada, assignor to The De Havilland Aircraft of Canada, Limited
Filed Mar. 15, 1963, Ser. No. 265,535
4 Claims. (Cl. 244—101)

This invention relates to improvements in dual purpose landing gear for use with transport aircraft, particularly those of the short run take-off class.

It is a requirement for certain types of transport aircraft to be operable from a number of various terrains, such as snow covered fields and the like, as well as from conventional concrete runways. Thus an aircraft may take off from an air base where conventional facilities and runway surfaces are available, and be required to land at a remote area where the landing surface is covered with snow and ice.

To provide aircraft landing gear suitable for both types of surfaces, that is snow and ice as well as concrete, requires the solution of many problems peculiar thereto. One such problem arises from the fact that the surface conditions in the snow bound areas vary to a considerable degree. Some surfaces may be quite soft and yielding while others hard and icy. These conditions complicate the provision of ski surfaces for an aircraft since the area of the ski with respect to the aircraft weight, that is to say the specific ski loading is limited by these adverse conditions.

Simply to provide a large enough ski area to accommodate the softer terrain would result in an excessive air drag penalty during take-off and would complicate the installation of such skis to the aircraft structure. On the other hand too little area of ski surface would result in take-off drag due to plowing action and to a limit would not offer sufficient support for the aircraft during landings.

Another problem associated with dual purpose landing gear is found in attempting to provide for conventional wheel landings on concrete in addition to the ski requirement. It will be appreciated that complicated, cumbersome mechanical devices are undesirable due to the weight factor. Also complication often leads to unreliability, and since the landing gear of an aircraft can be considered as primary structure, a simple means of effecting the conversion is preferable.

Still further problems are encountered when dealing with in flight control of the skis wherein air loads may affect the trim position of the skis as well as the stability of the aircraft. The ski trim must be maintained not only for the reason of in flight control but also for the proper attitude during touch-down.

A further requirement often met with in providing such dual purpose gear is the desirability of having such gear retractable into the aircraft structure. It will be seen that during retraction the proper ski trim must be maintained and that for this reason the associated jacking and linkages on the undercarriage gear must also accommodate for this movement.

It is therefore an object of the present invention to provide dual purpose landing gear for aircraft that will provide for conventional wheeled landings as well as provide skis for landing on snow and ice.

It is a further object of this invention to provide dual purpose landing gear that will be retractable into the aircraft structure so as to present less drag surface.

These and other objects and features of this invention will be apparent from the following detailed description and accompanying drawings.

In the drawings:

FIGURE 3 is a side elevation of the nose ski and gear shown in the extended, ski landing position;

FIGURE 5 is a side elevation of the main ski shown in the semi retracted, wheel landing position;

FIGURE 6 is a side elevation of the main ski shown in the fully retracted cruising trim position; and FIGURE 7 is a side elevation of the nose ski shown in the fully retracted cruising trim position.

FIGURE 8 is a diagram of the main ski geometry for conversion from ski to wheel landings.

Figure 1:
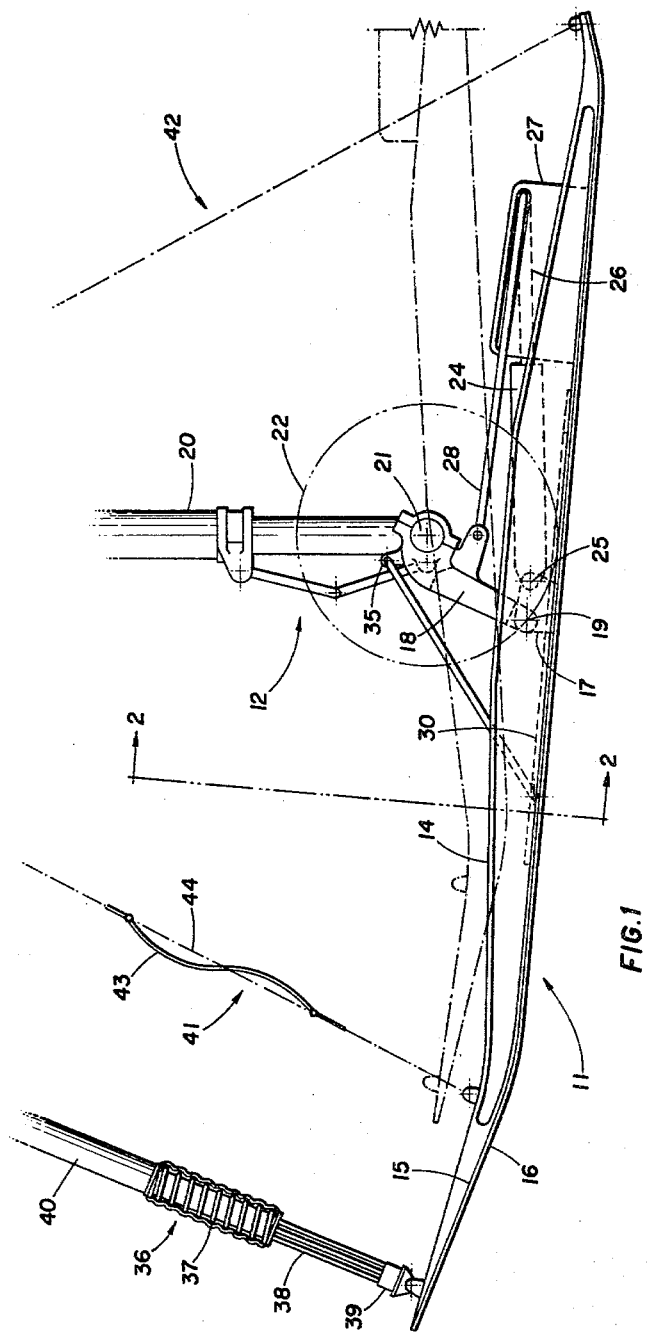
FIGURE 1 is a side elevation of a main ski and gear shown in the fully extended, ski landing position.
Figure 2:
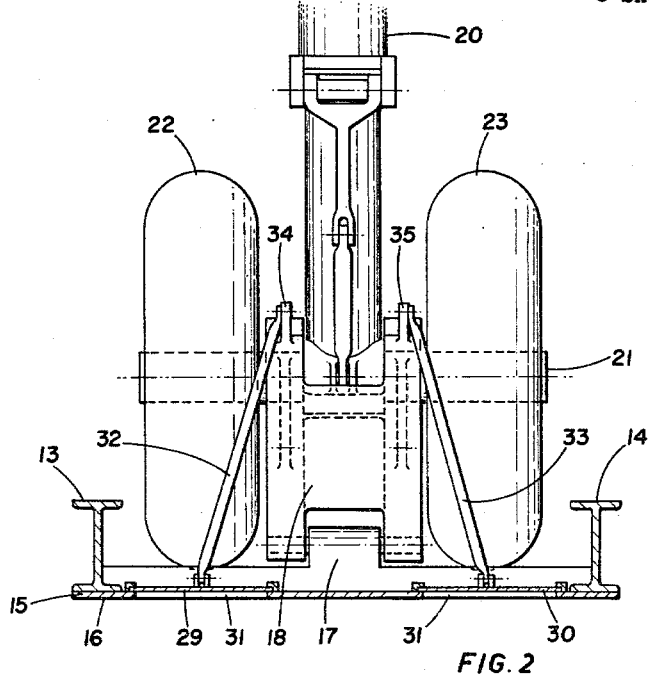
FIGURE 2 is a section along the line 2—2 in FIGURE 1.

Having reference to FIGURE 1 and FIGURE 2 a main ski indicated generally as 11 is illustrated being provided with support and retraction gear indicated generally as 12. Ski 11 comprises a pair of formed beams 13 and 14 being placed to either side of and secured to a sole plate 15 which forms the ski surface. In this embodiment it is preferable to coat the under surface of sole plate 15 with a plastic coating 16 in order to reduce drag and increase the resistance to wear.

A main ski attachment bracket 17 is secured to sole plate 15 and to beams 13 and 14 at a position approximating the centre of pressure for the main ski during landing. It will be seen that bracket 17 pivotally supports a link 18 on shaft 19. Pivot link 18 is rotatably supported on the ski pedestal 20 by attachment to the main axle 21 which also supports main wheels 22 and 23.

An actuator 24 is pivotally secured to bracket 17 at 25 and has an extensible piston rod 26 in sliding reciprocal engagement in support 27 which is also in rigid attachment with sole plate 15. A pair of constant length compression struts 28 (only one shown in FIGURE 1) are pivotally secured between link 18 and the free end of piston rod 26.

A pair of sliding doors 29, 30 are slidably positioned on the upper surface and in the ski landing condition are adapted to cover wheel openings 31 in sole plate 15. Actuating rods 32, 33 are pivotally secured to arms 34, 35 on link 18 and are also swivably secured to doors 29 and 30.

The ski is trimmed under all conditions by means of a spring trim strut indicated generally as 36 and comprising coil spring 37 preloaded by bungee cords 38. The strut 36 is secured to fitting 39 which in turn is pivotally secured to the nose of main ski 11. The trim strut 36 is anchored to the aircraft structure by means of member 40.

A pair of check cables indicated generally as 41 and 42 are secured to ski 11, cable 41 limiting the downward movement of the ski nose and cable 42 limiting the downward movement of the aft portion as well as performing the function of maintaining the preload on trim strut 36 in normal flight, gear down. The design of each cable 41 and 42 is similar, there being a non-resilient cable 43 and a resilient cable 44 keeping the ends of check cables 41 or 42 in tension at all times.

Figure 4:
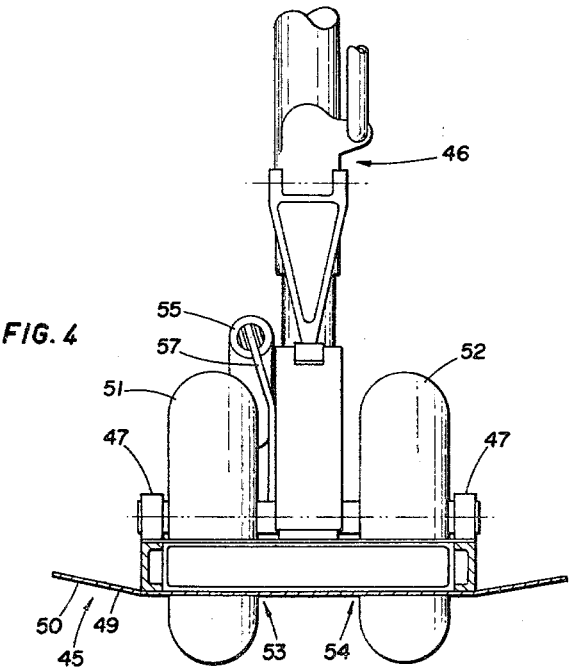
FIGURE 4 is a section along the line 4—4 in FIGURE 3.

Having reference to FIGURE 3 and FIGURE 4 a nose ski indicated generally as 45 is illustrated and is supported on nose wheel pedestal indicated generally as 46. A pair of nose wheel attachment brackets 47 are pivotally supported on nose wheel axle 48, brackets 47 being secured to nose ski sole plate 49 which is preferably coated with plastic coating 50.

In this embodiment nose wheels 51 and 52 project through cut-outs 53 and 54 in sole plate 49 at all times during flight and retraction, as well as in both ski and wheel landings.

An adjustable spring strut 55 is pivotally secured to ski 45 at 56 and to arm 57 at pivot 58. The length of strut 55 is variable preferably by hydraulic means, the length thereof being controlled by slaving strut 55 to the master cylinder 59 for pedestal 46. A spring within strut 55 maintains the trim of ski 45 and it has been found advisable to provide a mechanical lock on the adjustable portion of said strut to safeguard same against any failure in the hydraulic circuit.

In operation the landing gear as described will function to accommodate either concrete runways or snow terrain. In the event that a snow landing is contemplated ski 11 will be positioned as seen in FIGURE 1 and FIGURE 2 wherein actuator 24 is extended to position link 18 downwardly whereby ski 11 is in the fully down position. In this position it will be seen that wheels 22 and 23, bearing on the ski 11 will absorb shock loads upon landing. This is desirable since in the design of pedestal 20 the shock absorption ability of the pneumatic tires on wheels 22 and 23 have been counted on in reducing shock loads to the pedestal.

During landing the nose up attitude of skis 11 transfers a portion of the landing load to trim strut 36 which assists in maintaining the trim of skis 11. Any violent pitching of the main skis 11 is limited by check cables 41 or 42 and as has been stated cable 42 remains taut to assist in trimming the ski.

Upon it being desirable to perform a wheel landing actuator 24 is operated to shorten the distance between point 25 and the free end of piston rod 26. Since strut 28 is fixed in length shortening of actuator 24 will tend to cause ski 11 to rotate about shaft 19. Rotation however, is prevented due to the fact that check cable 42 is taut and for this reason ski 11 will remain in trim as it rotates about shaft 19 to assume the position as shown in FIGURE 5.

It will be seen that due to the geometry of the above described arrangement rotation about axle 21 combined with rotation about shaft 19 will move ski 11 backwards and at the same time raise ski 11 to a height where wheels 22, 23 project below sole plate 15. It will also be seen that the slot in support 27 will allow for the rearward movement of ski 11 while strut 28 remains fixed in length.

In addition during rotation of link 18 about axle 21 arm 35 rotates at a small radius about axle 21. The rearward movement of ski 11 will through rods 32, 33 operate doors 29, 30 to uncover slots 31 in sole plate 15 to allow wheels 22, 23 to project therethrough. Since the proper trim is maintained on skis 11 at all times by trim strut 36 in conjunction with check cable 42, the trim of skis 11 upon actuator 24 being retracted will be of the proper attitude for said wheel landing.

Upon retraction of the main undercarriage pedestal 20 is swung forwardly by the master retraction cylinder (not shown). This forward movement will cause the ski 11 together with pivot link 18 to rotate about axle 21. The rotation is controlled by trim strut 36 which maintains the proper trim on ski 11 at all times during retraction as well as in the other positions.

Motion of pedestal 20 is continued until ski 11 is in the fully retracted position as shown in FIGURE 6. In this position it is contemplated to provide suitable fairings to blend the ski profile into the aircraft. It is worthwhile to note that in the fully retracted position the actuator 24 is of the same length as it is for the wheel landing position as illustrated in FIGURE 5, that is to say the ski does not pivot about shaft 19 during full retraction into the aircraft.

At all positions and during all movements there is a load on trim strut 36 whereby said strut is always taut. Thus in the fully retracted position the strut is self storing, there merely being the requirement of providing space for same. However, the check cables 41, 42 become shortened in length during retraction and these cables are stowed by suitable means upon retraction of the gear.

Upon a wheeled landing of the aircraft the pedestal, being of a conventional oleo-pneumatic type is shortened and the ski 11 assumes the position shown in phantom in FIGURE 5. It will be seen that the shortening of pedestal 20 will alter slightly the trim of ski 11, the compressed or static position giving a slightly less nose down position of the ski, the strut 36 as before maintaining this trim.

In the operation of the nose ski the wheels 51, 52 remain extended through the bottom of sole plate 49 at all times. In this embodiment it is preferable to have said wheels extend below the nose ski since the additional complication for retraction may not be warranted for the nose ski.

Upon retraction of pedestal 46, as shown in FIGURE 6, the trimmer strut 55 is shortened in relation to command from the master cylinder 59. In this preferred embodiment the pedestal is swung backwardly and for this reason the trim strut 55 must be shortened to maintain proper trim of ski 45 at all times. The shortening of trimmer strut 55 is controlled at all times during retraction in order to maintain the ski trim. This slaving of the trimmer to the master cylinder 59 simplifies the trimming of ski 45 by eliminating any additional links from the ski to the aircraft structure.

During landing the pitching of ski 45 is limited by check cables 60, 61 which are similar to cables 41, 42 in construction. Upon retraction, cables 60, 61 are stored by convenient means depending upon the aircraft structure.

Having further reference to the drawings the geometry of the main ski 11 for conversion from ski to wheel is illustrated in FIGURE 8. In this drawing the solid lines indicate the ski down position and the phantom lines indicate the wheel down position.

During retraction of the ski to the wheel landing position axle or point 19 on the end of link 18 swings through an arc. This is accomplished by the shortening of actuator 24 which due to trim strut 36 and cable 42 cause a backward movement of link 18 relative to axle 21.

The members 17, 18, 28 and 24 form a quadrilateral and according to the principles for such figures, as side 24 is shortened then the angle "A" between sides 18 and 28 is decreased. This results in an increase of the angle "B" between sides 18 and 17 that is between pivot link 18 and ski bracket 17 thus maintaining the horizontal position of the ski 11.

It will be further understood that although specific embodiments of this invention have herein been described the invention also contemplates various alterations in design such as may fall within the scope of the appended claims.

What I claim is:

1. In a retractable duel purpose undercarriage for use with aircraft the combination of: a retractable pedestal secured to said aircraft and including an axle thereon; at least one wheel rotatably supported on said axle; a ski including a pair of parallel pivot points thereon being situated at the centre of pressure of said ski and said ski defining a cutout to clear said wheel; a pivot link having one end rotatably supported on said axle and the other end pivotally supported at one of said pivot points on said ski; an actuator secured to the second said pivots on said ski and having a piston rod extending therefrom; means for guiding the free end of said piston rod along the length of said ski; a compression strut having one end pivotally secured to the free end of said piston rod and having the other end rotatably supported on said pivot link; a pair of check cables mounted at the forward end and the aft end of said ski and being anchored to said aircraft; a resilient trim strut secured between said aircraft and the forward end of said ski; and means for operating said actuator whereupon shortening thereof said pivot link rotates about said axle thereby causing said ski to move upwardly and rearwardly, said wheel projecting through said cutout and below said ski.

2. In combination: a retractable aircraft undercarriage having a ski associated with a wheel, a pivot link pivotally secured to both said ski and said undercarriage; a compression strut pivotally secured to said pivot link and slidably secured to said ski; resilient means for maintaining the trim of said ski; and an actuator pivotally secured to both said ski and said compression strut at the sliding end thereof whereby retraction of said actuator will cause an upward and rearward movement of said ski relative to said aircraft, said resilient means maintaining the trim of said ski.

3. In a trimming device for use with dual purpose retractable undercarriages for aircraft wherein skis are combined with wheels the combination of: a ski including wheel clearance cutouts therein; a pivot link pivotally secured to both said ski and said undercarriage; a compression strut pivotally secured to said pivot link and slidably secured to said ski; resilient means for maintaining the trim of said ski; an actuator pivotally secured to both said ski and said compression strut at the sliding end thereof whereby retraction of said actuator will cause an upward and rearward movement of said ski relative to said aircraft, said resilient means maintaining the trim of said ski; and a door operable through linkage from said pivot link to close said cutouts in the fully extended position.

4. In a trimming device for use with dual purpose retractable undercarriages for aircraft wherein skis are combined with wheels the combination of: a ski including wheel clearance cutouts therein; a pivot link pivotally secured to both said ski and said undercarriage; a compression strut pivotally secured to said pivot link and slidably secured to said ski; a pair of check cables mounted at the forward end and the aft end of said ski and being anchored to said aircraft; a resilient trim strut secured between said aircraft and the forward end of said ski; an actuator pivotally secured to both said ski and said compression strut at the sliding end thereof whereby retraction of said actuator will cause an upward and rearward movement of said ski relative to said aircraft, said resilient means maintaining the trim of said ski; and a door operable through linkage from said pivot link to close said cutouts in the fully extended position.

References Cited by the Examiner
UNITED STATES PATENTS

| | | | |
|---|---|---|---|
| 2,106,934 | 2/38 | Saulnier | 244—108 |
| 2,733,026 | 1/56 | Ditter | 244—108 |
| 2,842,325 | 7/58 | Green | 244—108 X |

FERGUS S. MIDDLETON, *Primary Examiner.*
ANDREW H. FARRELL, MILTON BUCHLER,
*Examiners.*